UNITED STATES PATENT OFFICE.

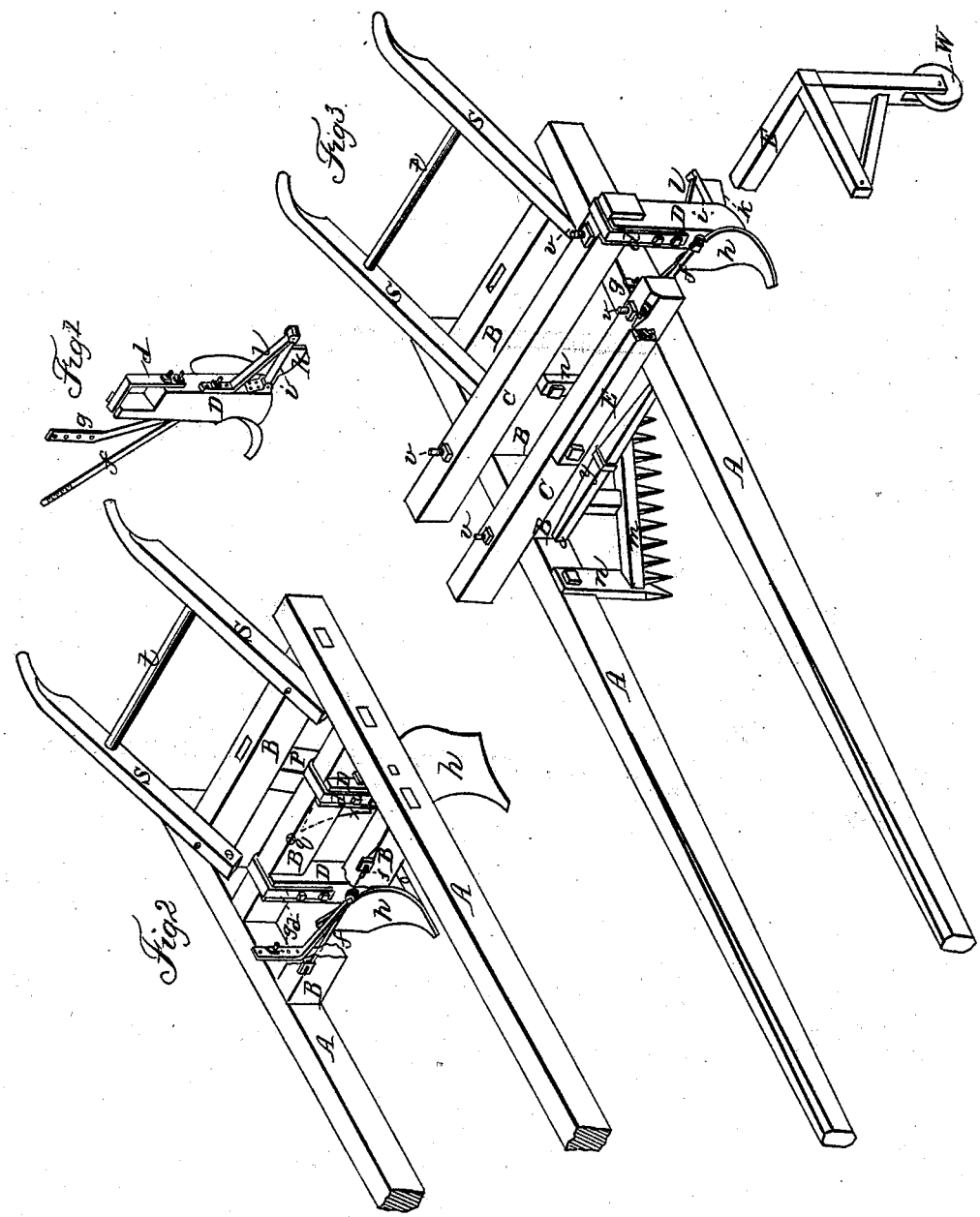

ANDREW RALSTON, OF WEST MIDDLETON, PENNSYLVANIA.

IMPROVEMENT IN CULTIVATORS.

Specification forming part of Letters Patent No. 4,171, dated September 2, 1845.

*To all whom it may concern:*

Be it known that I, ANDREW RALSTON, of West Middleton, in the county of Washington and State of Pennsylvania, have invented a new and Improved Corn Plow or Cultivator; and I do hereby declare the following to be a full and exact description of the same, reference being had to the accompanying drawings, making a part of this specification.

Figure 1 is a perspective elevation of the plow I make use of detached from the cultivator. Fig. 2 is a perspective elevation of a pair of shafts with my improved plows attached to the cross-pieces of the same, a part of the front cross-piece being broken out for the purpose of showing the manner of attachment. Fig. 3 is a perspective elevation of my improved plow with the marker attached, as arranged for marking out the ground previous to planting.

The nature of my invention consists in attaching an adjustable shoe and cutter to the rear of a cultivating-plow for the purpose of regulating the depth of the furrow and aiding in guiding the same; and in attaching my improved plow to the cross-pieces of a pair of shafts in such a manner as to be easily thrown in or out or varied in its position; and likewise in attaching extra cross-pieces to the shafts for the purpose of confining the plows to the outside of the shafts when it is desired to use them for marking out ground previous to planting; also, in combining a harrow or scraper with a cultivating-plow.

To enable others skilled in the mechanic arts to make and use my invention, I will proceed to describe its construction and operation.

I construct a pair of shafts, A A, for a horse to work between in the usual manner and connect them by three cross-pieces, B B B. To the middle cross-piece of the shafts I attach my improved plows, so as to throw furrows outward, and at a suitable distance to throw the earth upon two rows of corn at the same time. I secure the standards D D of the plows to the cross-pieces B of the shafts in the following manner: I cut a shoulder on the rear side of the top of the plow-standards, the part removed being just the depth and with of the center cross-piece B, so that when the standard is placed in its position the cross-piece B will exactly fit into the part removed. When the plow-standards D D are thus fitted to the central cross-piece B, I secure them by an iron strap or clevis, $d$, passing over the top of the central cross piece B, and down the front and rear sides of the standards D D, and fasten them by two screw-bolts passing through the clevis $d$ and the standards below the cross-piece B to which they are secured. I brace the plow-standards by the brace $f$, passing from the front of the same up diagonally through the front cross-piece B, and secure it by a screw-nut at the top. To the same bolt that fastens the brace $f$ to the standard I likewise secure the lateral brace $g$, which is made fast to the inside of the shafts between the first and second cross-pieces by a screw-bolt. There are three or four openings in the upper end of the brace $g$, for the screw-bolt securing the same to pass through for the purpose of adjusting it when the plows are moved out or in upon the cross-piece, to adapt them to different widths of the rows of corn to be cultivated.

I attach the mold-board $h$, which may be of any desired shape, to the standards D D in the usual manner. At the bottom of the plow-standards, on the rear side, I attach by a hinge the shoe-pieces $i\ i$. To the outer end of the shoe $i$ is secured by a hinge the brace I, which is carried up and secured by a screw-bolt to the back of the standard D. There are three or four openings in the brace I, for the screw-bolt to pass through for the purpose of raising or lowering the outer end of the shoe $i$, by which means the depth of the furrow made by the plow is regulated. At one side of the shoe $i$ there descends the thin cutter K, extending its entire length, which penetrates into the ground and prevents the plow from vibrating and renders it more easily managed and guided.

To the center of the aftermost cross-piece B there is fastened by tenon and mortise the standard P, of the same length as the standards D D. To the front of the standard P there is secured an ordinary cultivator-point, $x$, in the usual manner, for the purpose of plowing between the side plows. A brace passes from the front of the standard P up through the center cross-piece B, the head of which is seen at $q$.

I sometimes use in combination with my improved corn-plow a harrow, $m$, placed obliquely in front or immediately in the rear of the side plows. When placed in front of the side plows I secure its front standard, n, to the inside of one of the shafts in front of the cross-pieces, and its rear standard to the front side of the middle cross-piece B. When the harrow m is used in the rear of the plows I secure its front standard, n, to the inside of the shafts between the front and middle cross-pieces B, and its rear standard to the inside of the aftermost cross-piece B.

S S are the handles for guiding the improved corn-plow, and t is a cross-piece connecting them.

I sometimes use a scraper in front of the plows, arranged in the same position and secured in the same manner as the harrow m, for the purpose of removing stone, lumps of earth, or rubbish that may be in the way of the plows, in combination with a harrow in the rear of the plow, for the purpose of evening down the earth thrown up by the same, and bringing it more equally around the corn.

y is the single-tree, to which the horse is geared for working the plow.

When I wish to mark out the ground previous to planting I detach the standard P, with the cultivator-point and the harrow and scraper, and attach a couple of extra cross-pieces, C C, immediately over the front and middle cross-pieces, B B, and secure them by the screw-bolts v v, having hooks at their lower ends which pass under the shafts. The ends of the extra cross-pieces C C extend outside the shafts, and the plows are likewise secured to them outside of the shafts. The plow-standards D D are secured to the extra cross-pieces C C in the same manner they are to the central cross-piece B B. The brace f passes through and is secured to the front extra piece C, and the lateral brace g is secured to the outside of the shafts.

To the center of the front extra cross-piece C is secured by a strong bolt the marker E. The roller w on the end of the marker is placed the same distance from the plow on that side of the frame that the plows are from each other. The roller w, running in a furrow, guides and directs the plows in a direction parallel with the same.

What I claim as my invention, and desire to secure by Letters Patent, is—

1. The attachment to the rear of the plow of the adjustable hinged shoe i, guiding-cutter K, attached thereto, and adjusting-brace I, all combined and operating substantially in the manner and for the purpose herein set forth.

2. The attachment to the plow standards and shafts of the lateral adjusting-braces g g, substantially in the manner and for the purpose herein set forth.

ANDREW RALSTON.

Witnesses:
GIDEON SHRYOCK,
Z. C. ROBBINS.